(12) United States Patent
Onoda et al.

(10) Patent No.: US 12,743,551 B2
(45) Date of Patent: Sep. 22, 2026

(54) DATA AGGREGATION DEVICE

(71) Applicant: NTT DOCOMO, INC., Tokyo (JP)

(72) Inventors: Kasumi Onoda, Chiyoda-ku (JP); Masayuki Terada, Chiyoda-ku (JP); Hiroshi Aono, Chiyoda-ku (JP); Tomohiro Nakagawa, Chiyoda-ku (JP); Keita Hasegawa, Chiyoda-ku (JP); Kazuma Nozawa, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 32 days.

(21) Appl. No.: 18/867,292

(22) PCT Filed: Mar. 29, 2023

(86) PCT No.: PCT/JP2023/012842
§ 371 (c)(1),
(2) Date: Nov. 19, 2024

(87) PCT Pub. No.: WO2023/228560
PCT Pub. Date: Nov. 30, 2023

(65) Prior Publication Data

US 2025/0328689 A1 Oct. 23, 2025

(30) Foreign Application Priority Data

May 23, 2022 (JP) ................................ 2022-083921

(51) Int. Cl.
*G06F 21/62* (2013.01)

(52) U.S. Cl.
CPC ................................ *G06F 21/6254* (2013.01)

(58) Field of Classification Search
CPC ......................... G06F 21/6254; G06F 16/2458
See application file for complete search history.

(56) References Cited

U.S. PATENT DOCUMENTS

2005/0097079 A1* 5/2005 Machida ............... G06F 16/955 707/E17.112
2007/0197201 A1* 8/2007 Washio ............. H04M 1/72406 455/418

(Continued)

FOREIGN PATENT DOCUMENTS

JP 2012-8670 A 1/2012

OTHER PUBLICATIONS

International Search Report issued May 30, 2023 in PCT/JP2023/012842, filed on Mar. 29, 2023, 2 pages.

(Continued)

*Primary Examiner* — J. Brant Murphy
(74) *Attorney, Agent, or Firm* — Oblon, McClelland, Maier & Neustadt, L.L.P.

(57) ABSTRACT

An objective is to collate data for each group. A data aggregation device 1 that collates and aggregates data which is possessed by each of two or more organizations and which is correlated with individuals and groups includes an aggregation unit 12 configured to collate and aggregate the data, which is correlated with collation identifiers which are identifiers for identifying the individuals and the groups, for each group on the basis of the collation identifiers. The data aggregation device 1 further includes a calculation unit 13 configured to perform a predetermined calculation on an aggregation result for each group from the aggregation unit 12. The predetermined calculation is a calculation which is designated in advance by a user. The predetermined calculation integrates the aggregation result for each group from the aggregation unit 12.

9 Claims, 18 Drawing Sheets

COMPANY A: USER LIST

GROUP 1 MONDAY

COLLATION IDENTIFIER
AAA$
BBB$
....

GROUP 2 TUESDAY

COLLATION IDENTIFIER
AAA#
BBB#
....

(56) References Cited

U.S. PATENT DOCUMENTS

| | | | | |
|---|---|---|---|---|
| 2015/0026780 | A1* | 1/2015 | Igarashi | H04L 63/0236 726/5 |
| 2018/0189515 | A1* | 7/2018 | Wang | G06F 21/6254 |
| 2018/0218173 | A1* | 8/2018 | Perkins | G06F 21/6254 |
| 2021/0011938 | A1* | 1/2021 | Ochiai | G06F 16/35 |

OTHER PUBLICATIONS

English translation of International Preliminary Report on Patentability and Written Opinion issued Dec. 5, 2024 in PCT/JP2023/012842, 5 pages.

* cited by examiner

COMPANY A DATA
USER IDENTIFIER
aaa
bbb
....
DATA ASSOCIATION
COMPANY B DATA
USER IDENTIFIER
LOCATION INFORMATION
aaa
AREA A
ccc
AREA C
....
....

Fig.7

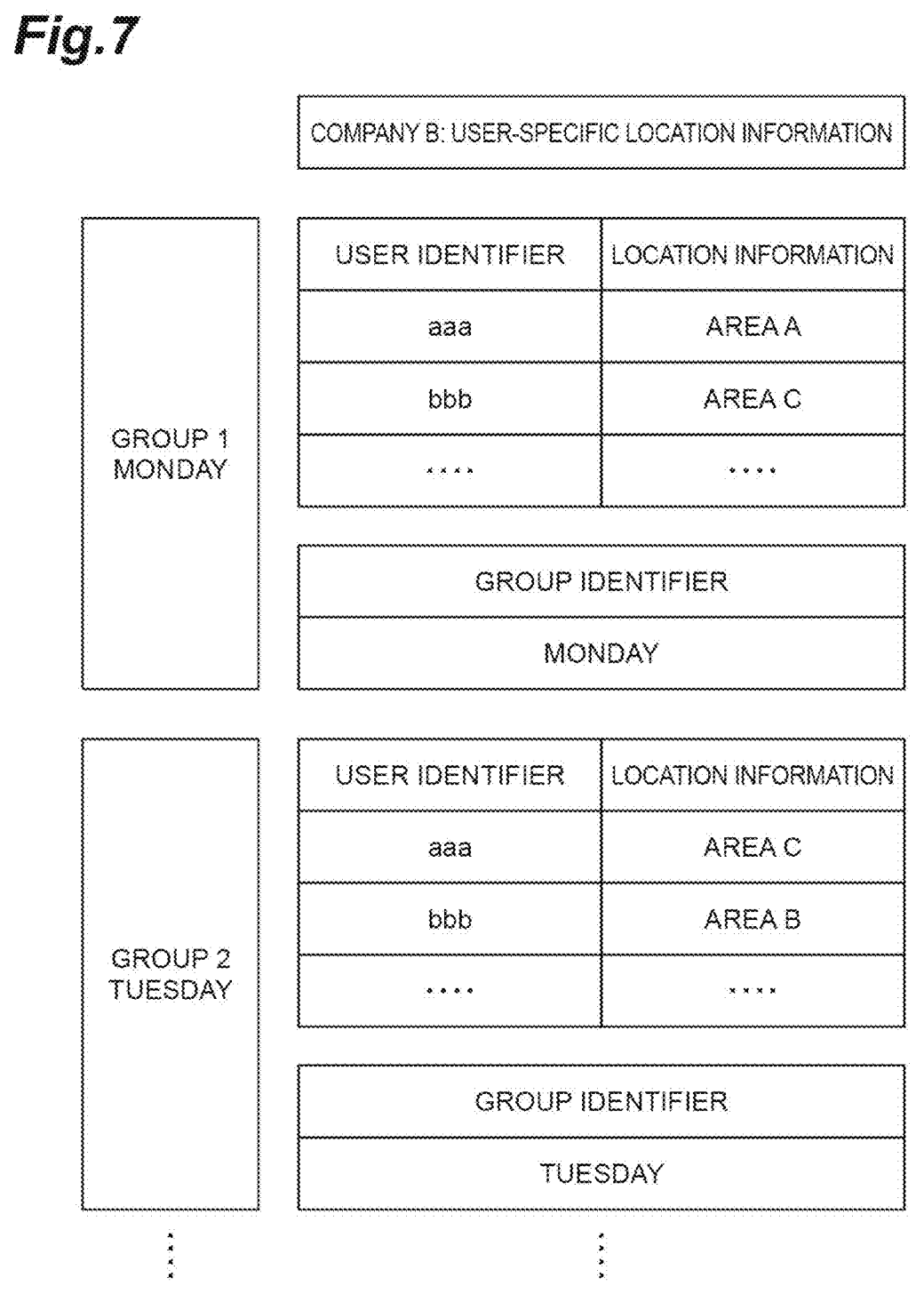

COMPANY B: USER-SPECIFIC LOCATION INFORMATION

GROUP 1
MONDAY

| USER IDENTIFIER | LOCATION INFORMATION |
| --- | --- |
| aaa | AREA A |
| bbb | AREA C |
| .... | .... |

| GROUP IDENTIFIER |
| --- |
| MONDAY |

GROUP 2
TUESDAY

| USER IDENTIFIER | LOCATION INFORMATION |
| --- | --- |
| aaa | AREA C |
| bbb | AREA B |
| .... | .... |

| GROUP IDENTIFIER |
| --- |
| TUESDAY |

COMPANY B: USER-SPECIFIC LOCATION INFORMATION

| | COLLATION IDENTIFIER | LOCATION INFORMATION |
|---|---|---|
| GROUP 1 MONDAY | AAA$ | AREA A |
| | BBB$ | AREA C |
| | .... | .... |

| | COLLATION IDENTIFIER | LOCATION INFORMATION |
|---|---|---|
| GROUP 2 TUESDAY | AAA# | AREA C |
| | BBB# | AREA B |
| | .... | .... |

COMPANY A: USER LIST

COMPANY B: USER-SPECIFIC LOCATION INFORMATION

MONDAY

| COLLATION IDENTIFIER |
| --- |
| AAA$ |
| BBB$ |
| .... |

×

| COLLATION IDENTIFIER | LOCATION INFORMATION |
| --- | --- |
| AAA$ | AREA A |
| BBB$ | AREA C |
| .... | .... |

TUESDAY

| COLLATION IDENTIFIER |
| --- |
| AAA# |
| BBB# |
| .... |

×

| COLLATION IDENTIFIER | LOCATION INFORMATION |
| --- | --- |
| AAA# | AREA C |
| BBB# | AREA B |
| .... | .... |

MONDAY

| | AREA A | AREA B | AREA C |
| --- | --- | --- | --- |
| MONDAY | 15 | 12 | 38 |

TUESDAY

| | AREA A | AREA B | AREA C |
| --- | --- | --- | --- |
| TUESDAY | 12 | 21 | 27 |

⋮ ⋮

| AREA A | AREA B | AREA C |
| --- | --- | --- |
| 105 | 251 | 316 |

*Fig.12*

| AREA A | AREA B | AREA C |
| --- | --- | --- |
| 101 | 270 | 310 |

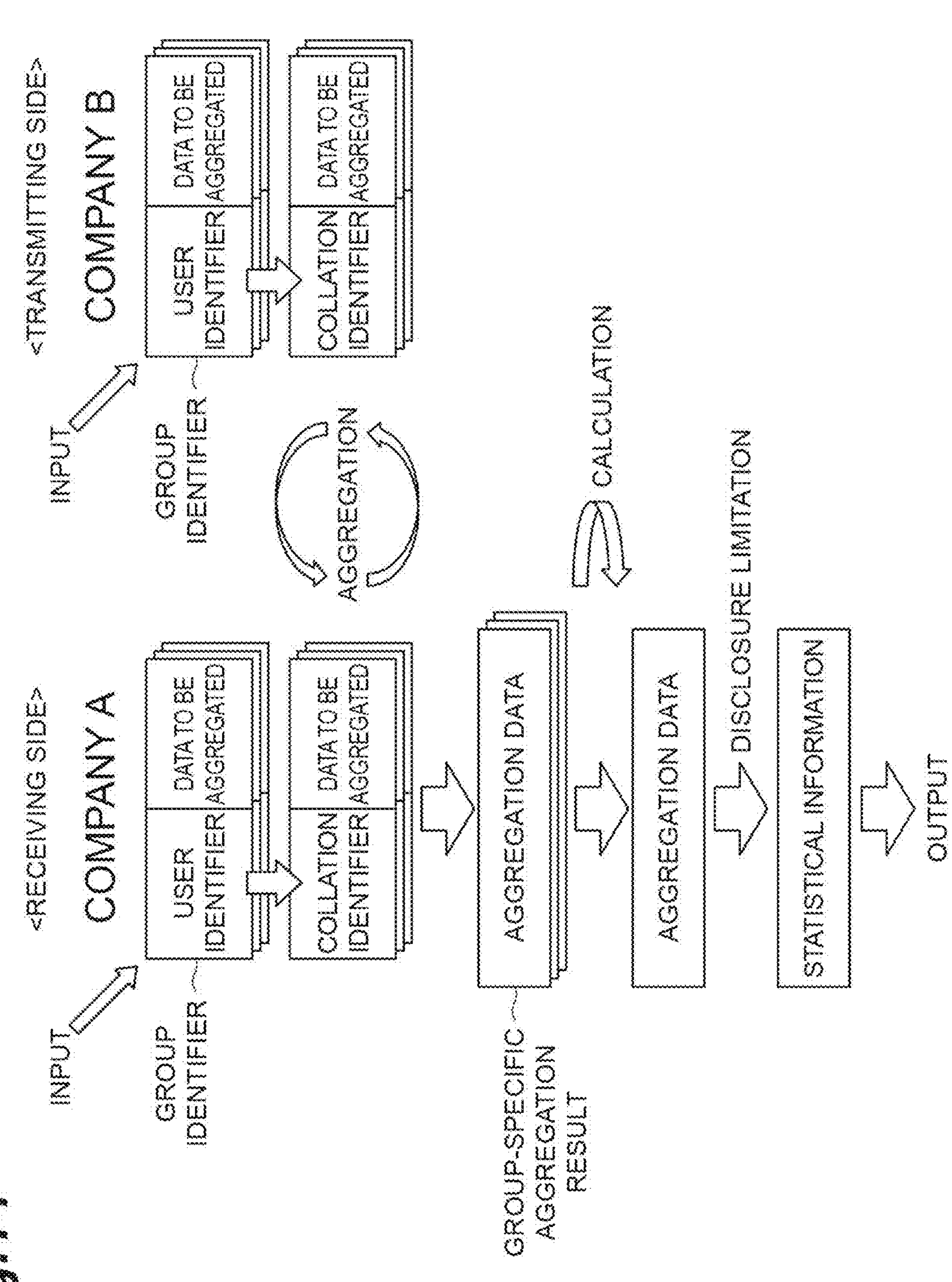
Fig.14
<RECEIVING SIDE>
COMPANY A
<TRANSMITTING SIDE>
COMPANY B
INPUT
GROUP IDENTIFIER
USER IDENTIFIER
DATA TO BE AGGREGATED
COLLATION IDENTIFIER
DATA TO BE AGGREGATED
INPUT
GROUP IDENTIFIER
USER IDENTIFIER
DATA TO BE AGGREGATED
COLLATION IDENTIFIER
DATA TO BE AGGREGATED
AGGREGATION
AGGREGATION DATA
GROUP-SPECIFIC AGGREGATION RESULT
CALCULATION
AGGREGATION DATA
DISCLOSURE LIMITATION
STATISTICAL INFORMATION
OUTPUT

*Fig.15*

AGGREGATION RESULT OF GROUP 1

| AREA A | AREA B | AREA C |
|---|---|---|
| 10 +n | 22 +n | 51 +n |

AGGREGATION RESULT OF GROUP 2

| AREA A | AREA B | AREA C |
|---|---|---|
| 45 +n | 75 +n | 105 +n |

AGGREGATION RESULT OF GROUP 3

| AREA A | AREA B | AREA C |
|---|---|---|
| 34 +n | 99 +n | 45 +n |

ADDITION OF NOISE

ADDITION OF NOISE

ADDITION OF NOISE

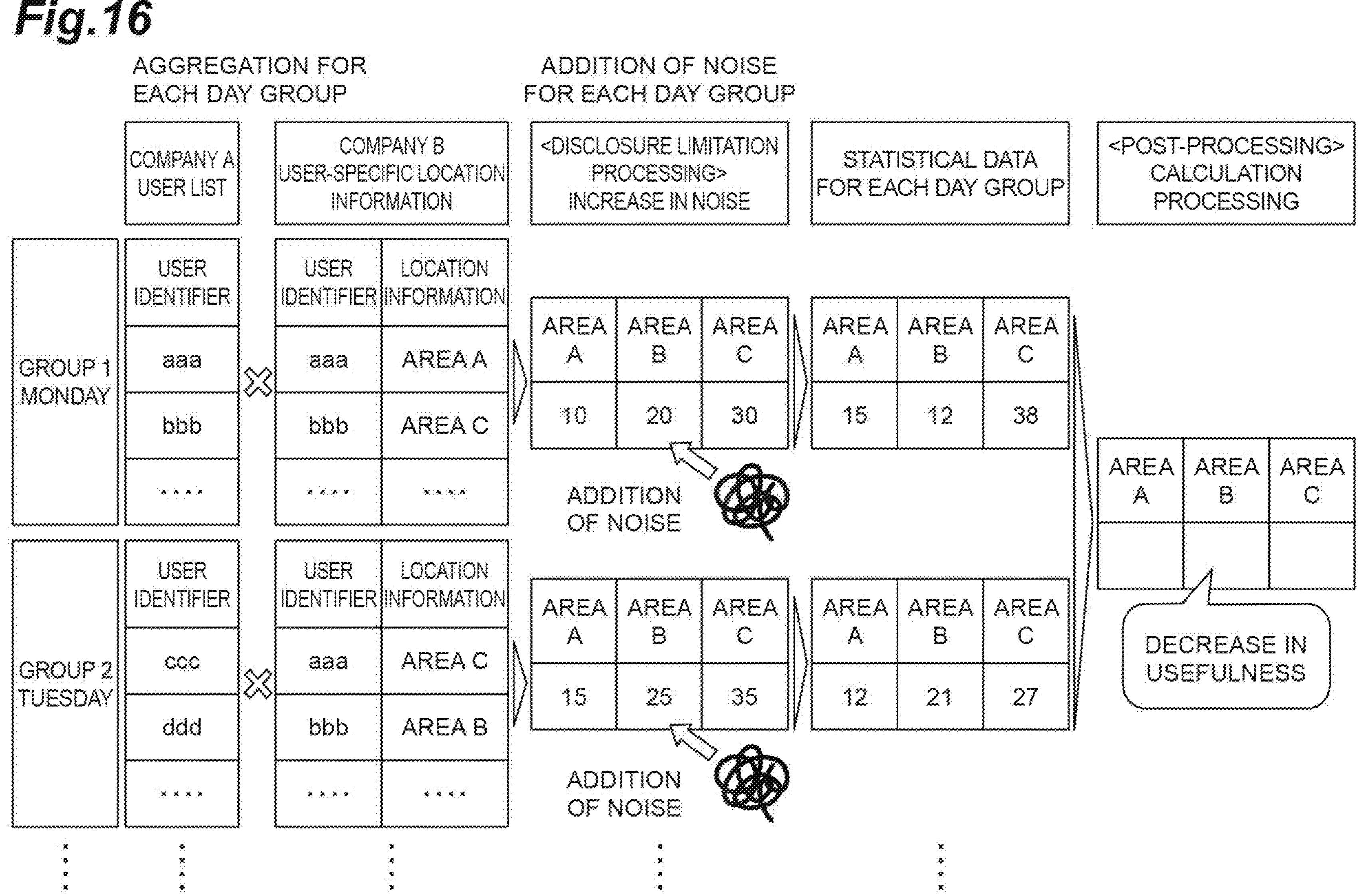
Fig.16
AGGREGATION FOR EACH DAY GROUP
ADDITION OF NOISE FOR EACH DAY GROUP
COMPANY A USER LIST
COMPANY B USER-SPECIFIC LOCATION INFORMATION
<DISCLOSURE LIMITATION PROCESSING> INCREASE IN NOISE
STATISTICAL DATA FOR EACH DAY GROUP
<POST-PROCESSING> CALCULATION PROCESSING
GROUP 1 MONDAY
USER IDENTIFIER
aaa
bbb
USER IDENTIFIER
LOCATION INFORMATION
aaa
AREA A
bbb
AREA C
AREA A AREA B AREA C
10 20 30
AREA A AREA B AREA C
15 12 38
ADDITION OF NOISE
GROUP 2 TUESDAY
USER IDENTIFIER
ccc
ddd
USER IDENTIFIER
LOCATION INFORMATION
aaa
AREA C
bbb
AREA B
AREA A AREA B AREA C
15 25 35
AREA A AREA B AREA C
12 21 27
ADDITION OF NOISE
AREA A AREA B AREA C
DECREASE IN USEFULNESS

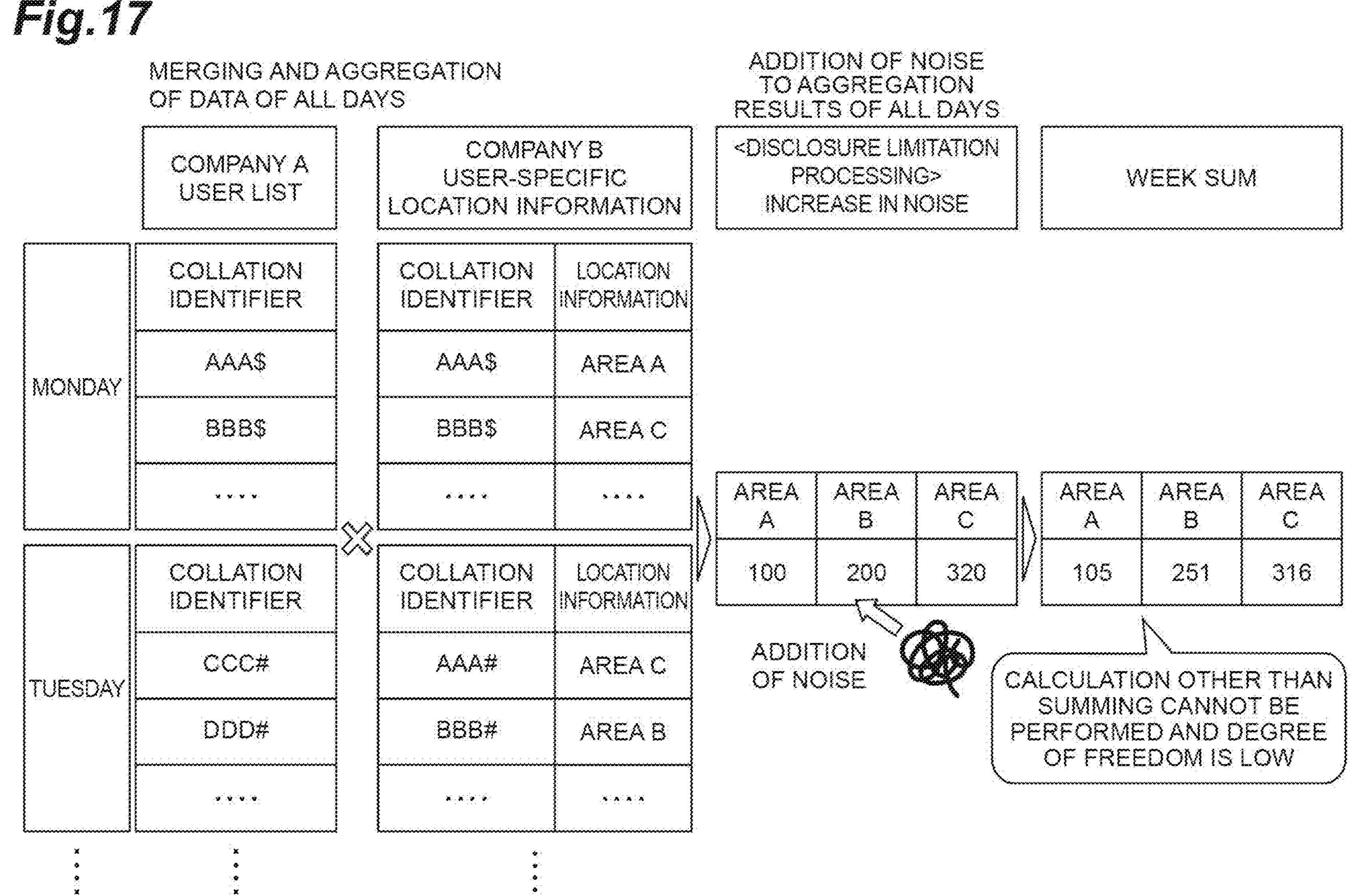
Fig.17
MERGING AND AGGREGATION OF DATA OF ALL DAYS
COMPANY A USER LIST
COMPANY B USER-SPECIFIC LOCATION INFORMATION
MONDAY
COLLATION IDENTIFIER
AAA$
BBB$
....
COLLATION IDENTIFIER
LOCATION INFORMATION
AAA$
AREA A
BBB$
AREA C
....
....
TUESDAY
COLLATION IDENTIFIER
CCC#
DDD#
....
COLLATION IDENTIFIER
LOCATION INFORMATION
AAA#
AREA C
BBB#
AREA B
....
....
ADDITION OF NOISE TO AGGREGATION RESULTS OF ALL DAYS
<DISCLOSURE LIMITATION PROCESSING> INCREASE IN NOISE
AREA A
AREA B
AREA C
100
200
320
ADDITION OF NOISE
WEEK SUM
AREA A
AREA B
AREA C
105
251
316
CALCULATION OTHER THAN SUMMING CANNOT BE PERFORMED AND DEGREE OF FREEDOM IS LOW

DATA AGGREGATION DEVICE

TECHNICAL FIELD

An aspect of the present disclosure relates to a data aggregation device that collates and aggregates data possessed by each of two or more organizations.

BACKGROUND ART

Patent Literature 1 discloses an operation processing system that distributes a collation batch process for collating first data and second data of which each includes a plurality of entries to a plurality of calculation servers and causes the plurality of calculation servers to perform the collation batch process.

CITATION LIST

Patent Literature

Patent Literature 1: Japanese Unexamined Patent Publication No. 2012-008670

SUMMARY OF INVENTION

Technical Problem

However, in the operation processing system, for example, data cannot be collated for each group. Therefore, there is need for collating data for each group.

Solution to Problem

According to an aspect of the present disclosure, there is provided a data aggregation device that collates and aggregates data which is possessed by each of two or more organizations and which is correlated with individuals and groups, the data aggregation device including an aggregation unit configured to collate and aggregate the data, which is correlated with collation identifiers which are identifiers for identifying the individuals and the groups, for each group on the basis of the collation identifiers.

According to this aspect, data is collated and aggregated for each group on the basis of a collation identifier. That is, it is possible to collate data for each group.

Advantageous Effects of Invention

According to the aspect of the present disclosure, it is possible to collate data for each group.

BRIEF DESCRIPTION OF DRAWINGS

FIG. 7 A diagram illustrating an example of data possessed by company B.

FIG. 8 A diagram illustrating an example of data in which a collation identifier is correlated with the data illustrated in FIG. 7.

FIG. 9 A diagram illustrating a situation in which the data illustrated in FIG. 5 and the data illustrated in FIG. 8 are collated and aggregated.

FIG. 10 A diagram illustrating an example of aggregation data for each group.

FIG. 12 A diagram illustrating an example of statistical information in which noise is added to the integrated aggregation data.

FIG. 14 A diagram illustrating another example of the processes that are performed by the data aggregation system.

FIG. 15 A diagram illustrating an example in which usefulness is decreased due to an influence of noise.

FIG. 16 A diagram illustrating a problem when aggregation of data is performed for each group.

FIG. 17 A diagram illustrating a problem when a collation identifier is generated and data of a plurality of groups is merged.

DESCRIPTION OF EMBODIMENTS

Hereinafter, an embodiment of the present disclosure will be described in detail with reference to the accompanying drawings. In description with reference to the drawings, the same elements will be referred to by the same reference signs, and repeated description thereof will be omitted. The embodiment of the present disclosure in the following description is a specific example of the present disclosure, and the present disclosure is not limited to the embodiment unless there is description for limiting the present disclosure.

Figure 1:
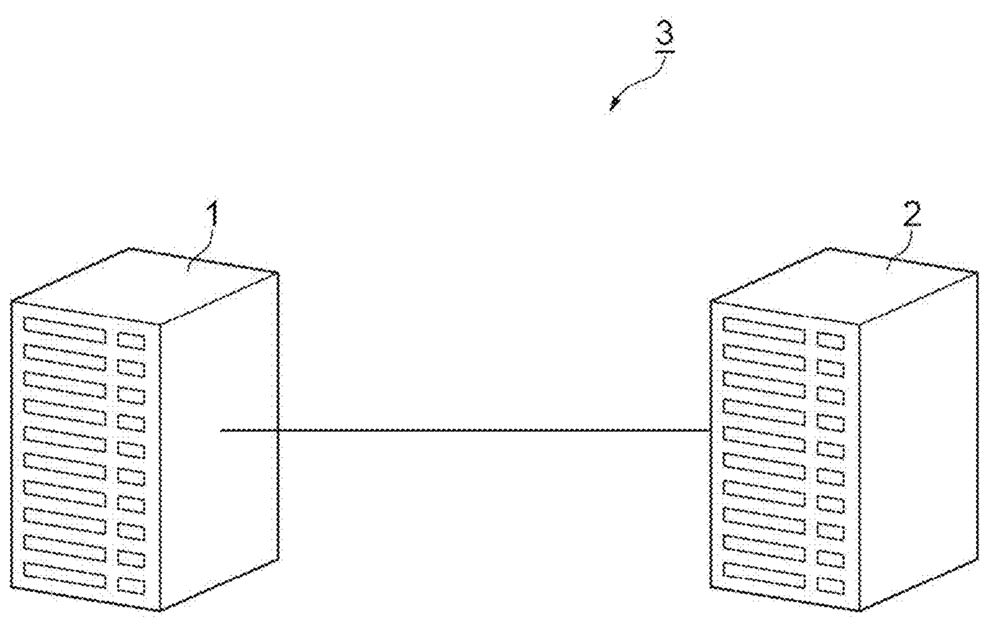
FIG. 1A diagram illustrating an example of a system configuration of a data aggregation system including a data aggregation device according to an embodiment.

FIG. 1 is a diagram illustrating an example of a system configuration of a data aggregation system 3 including a data aggregation device 1 according to an embodiment. As illustrated in FIG. 1, the data aggregation system 3 includes a data aggregation device 1 and a data transmission device 2. The data aggregation device 1 and the data transmission device 2 are communicatively connected to each other via a network such as the Internet and can mutually transmit and receive information. In this embodiment, one data transmission device 2 is assumed, but the number of data transmission devices 2 is not limited thereto and a plurality of data transmission devices 2 may be provided. When the plurality of data transmission devices 2 are provided, each data transmission device 2 is communicatively connected to the data aggregation device 1 via a network, and they can mutually transmit and receive information.

The data aggregation device 1 is a computer (server) device that collates and aggregates data which is possessed by each of two or more organizations and which are correlated with individuals and groups.

Regarding two or more organizations, company A and company B which are two organizations are assumed in this embodiment, but the number of organizations is not limited thereto and three or more organizations may be provided. It is assumed that the data aggregation device 1 stores data managed by company A and possessed by company A. It is also assumed that the data is correlated with individuals and groups. On the other hand, it is assumed that the data transmission device 2 stores data managed by company B and possessed by company B. Similarly, it is assumed that the data is correlated with individuals and groups. The data aggregation device 1 collates and aggregates data possessed by company A and stored in the data aggregation device 1 and data possessed by company B and stored in the data transmission device 2.

Figure 2:
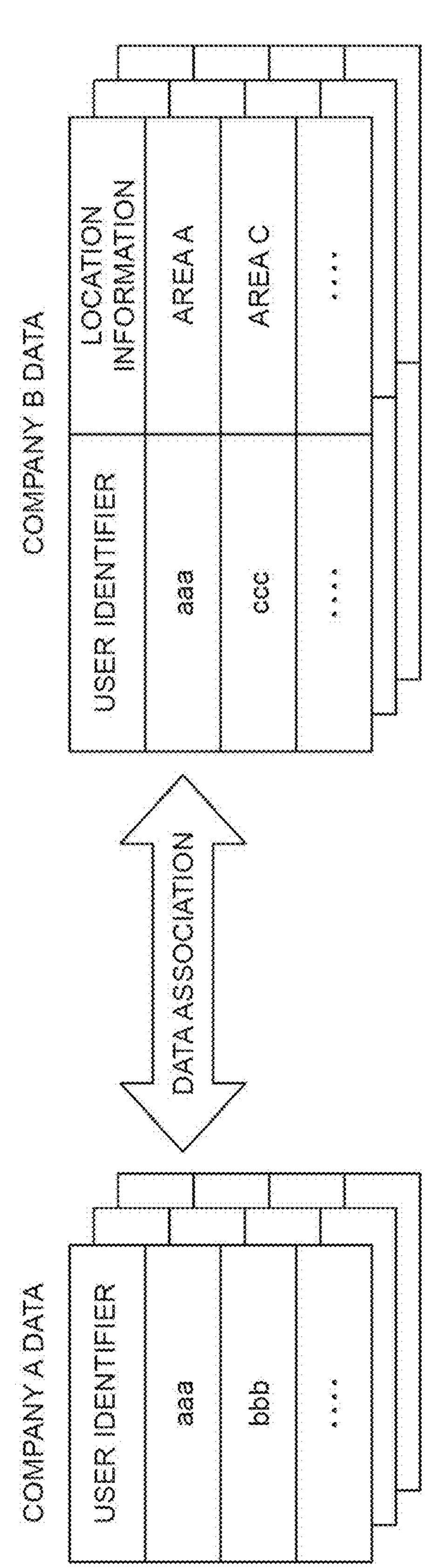
FIG. 2 A diagram illustrating data association of data possessed by each of two companies.

FIG. 2 is a diagram illustrating data association of data possessed by each of two companies. Specifically, in FIG. 2, data possessed by company A and stored in the data aggregation device 1 and data possessed by company B and stored in the data transmission device 2 are associated (collated, aggregated, and the like). In data association, data may be associated without mutual revealing of data. In this case, data in the process of collation and aggregation is not disclosed to anybody. Examples of a technique for associating data without mutual revealing of data include de-identification process, secure computation, and disclosure limitation process. Details thereof will be described later.

A group is a group of persons or objects which are classified on the basis of common characteristics. Examples of the group include a day of the week, an event, a boarding flight, and a purchased article.

The group may be a unit of aggregation when data is collated. The group may be a unit of aggregation when two or more companies collate data on the basis of user identifiers for identifying individuals. For example, when data is collated for each day of the week, a unit of aggregation at this time of collation is a group. No individuals correlated with data which is correlated with the same group may overlap. That is, no user identifiers may overlap in a group. User identifiers should not overlap in a group. In this embodiment, a "user" (which may be appropriately replaced with an "individual" in this embodiment) corresponding to an individual is not a user of the data aggregation device 1, but a user in a general broad meaning.

The data transmission device 2 is a computer (server) device that stores data possessed by company B as described above. The data transmission device 2 transmits data stored therein or data based on the data to the data aggregation device 1 for collation and aggregation in the data aggregation device 1.

Figure 3:
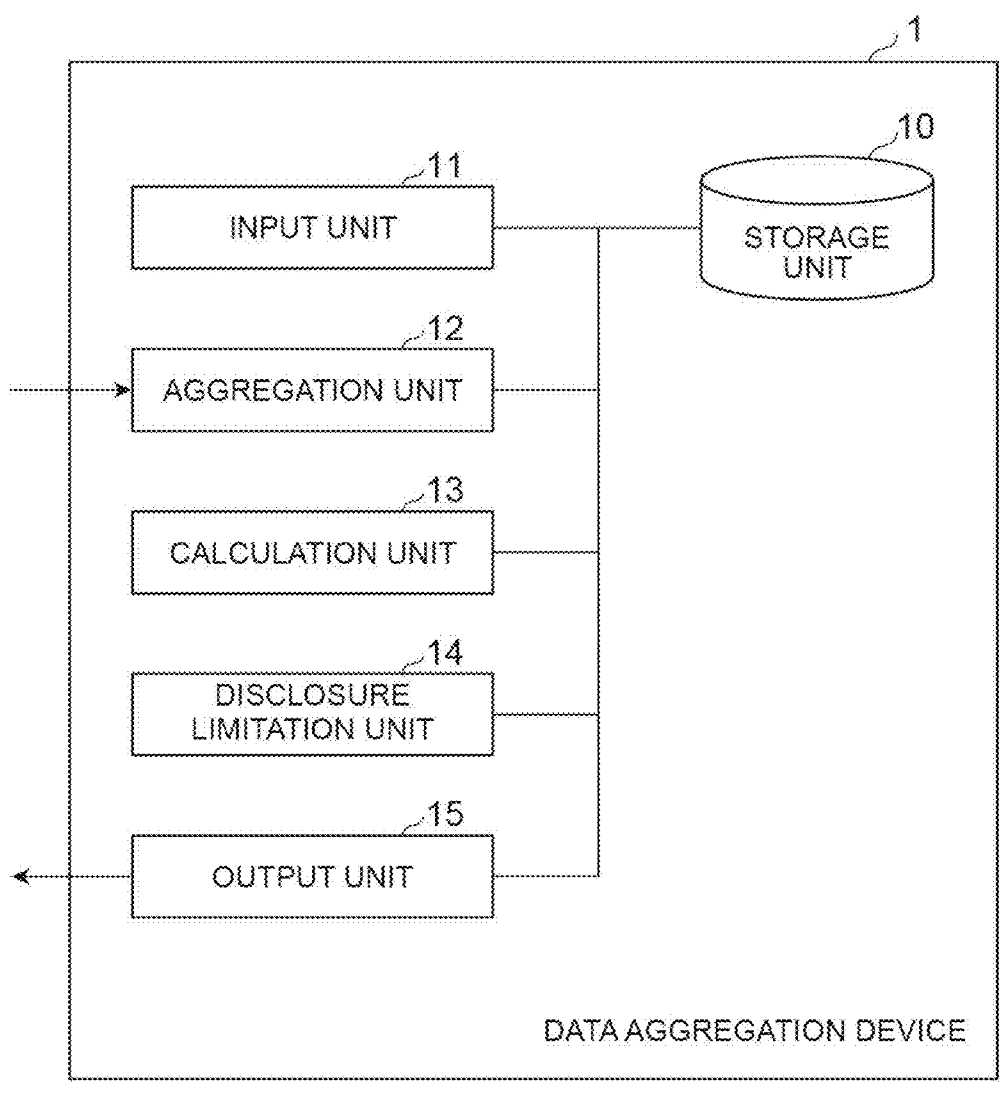
FIG. 3 A diagram illustrating an example of a functional configuration of the data aggregation device according to the embodiment.

FIG. 3 is a diagram illustrating an example of a functional configuration of the data aggregation device 1 according to the embodiment. The data aggregation device 1 includes a storage unit 10, an input unit 11, an aggregation unit 12 (an aggregation unit), a calculation unit 13 (a calculation unit), a disclosure limitation unit 14 (a disclosure limitation unit), and an output unit 15, as illustrated in FIG. 3.

The functional blocks of the data aggregation device 1 are assumed to operate in the data aggregation device 1, but are not limited thereto. For example, some of the functional blocks of the data aggregation device 1 may be provided in a computer device other than the data aggregation device 1 and connected to the data aggregation device 1 via a network and serve to appropriately transmit and receive information to and from the data aggregation device 1. Some functional blocks of the data aggregation device 1 may be omitted, a plurality of functional blocks may be unified into one functional block, and one functional block may be divided into a plurality of functional blocks.

The functions of the data aggregation device 1 illustrated in FIG. 3 will be described below.

The storage unit 10 stores arbitrary information used for calculation or the like in the data aggregation device 1, calculation results in the data aggregation device 1, and the like. For example, the storage unit 10 stores data possessed by company A. Information stored in the storage unit 10 may be appropriately referred to by the functions of the data aggregation device 1.

The input unit 11 receives an input of data to be collated (for both collation). The input data is correlated with individuals and groups. For example, the input unit 11 receives an input of data possessed by company A and stored in the storage unit 10. The input unit 11 may receive an input of data divided into groups.

Figure 4:
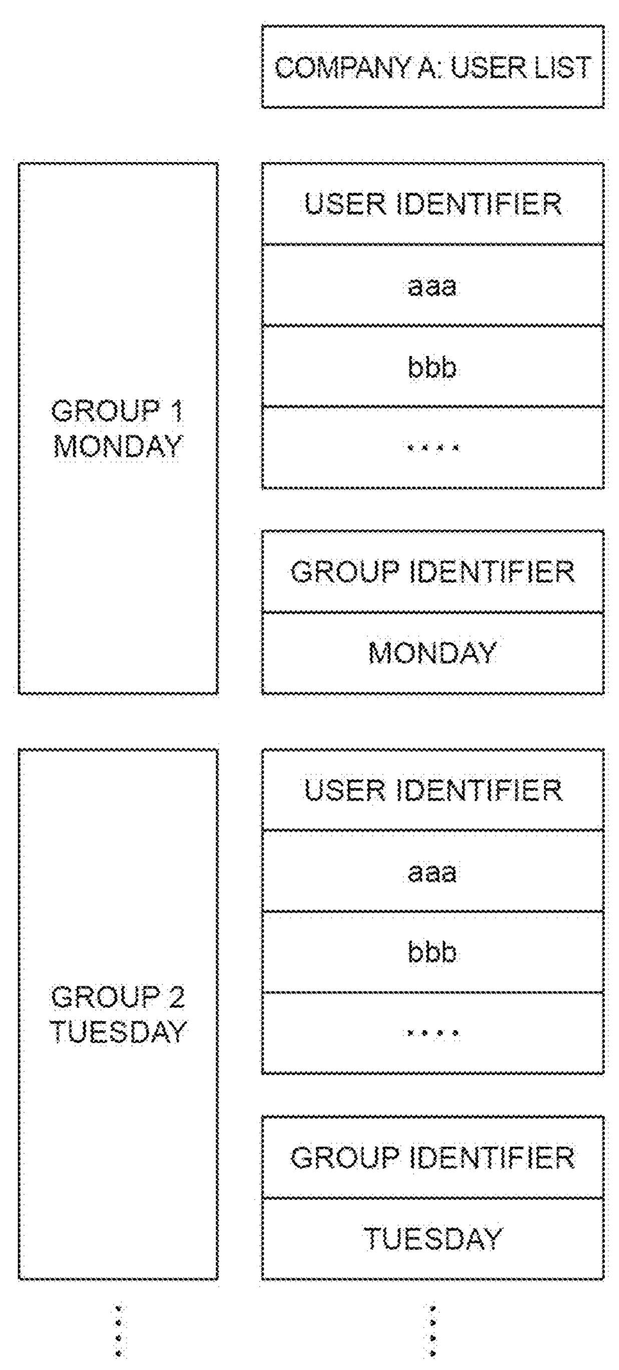
FIG. 4 A diagram illustrating an example of data possessed by company A.

FIG. 4 is a diagram illustrating an example of data possessed by company A. The data illustrated in FIG. 4 is a user list which is a list of individuals for each group. As illustrated in FIG. 4, in the user list, individuals of which a user identifier for identifying an individual is "aaa" and "bbb" are included in group 1 "Monday" of which a group identifier for identifying a group is "Monday," and individuals of which a user identifier for identifying an individual is "aaa" and "bbb" are included in group 2 "Tuesday" of which a group identifier for identifying a group is "Tuesday." That is, the user list is correlated with individuals and groups. In this embodiment, for the purpose of simplification of explanation, only user identifiers are included as data included in groups in the user list, but the present disclosure is not limited thereto, and a plurality of types of data may be included. For example, data on one or more attributes (for example, sex and age) of individuals identified by the user identifiers may be included in addition to the user identifiers.

No user identifiers overlap in the same group. For example, only one user identifier "aaa" is included in group 1 "Monday," and two or more user identifiers "aaa" are not present therein. On the other hand, a user identifier may overlap in different groups. For example, the user identifier "aaa" is included in group 1 "Monday" and group 2 "Tuesday."

The input unit 11 generates collation identifiers which are identifiers for identifying the individuals and the groups in the data and correlates the generated collation identifiers with the data. The input unit 11 generates the collation identifiers from a group identifier for identifying a group to be collated and the user identifiers. The collation identifier identifies a group in which both data to be collated is collated.

Figure 5:
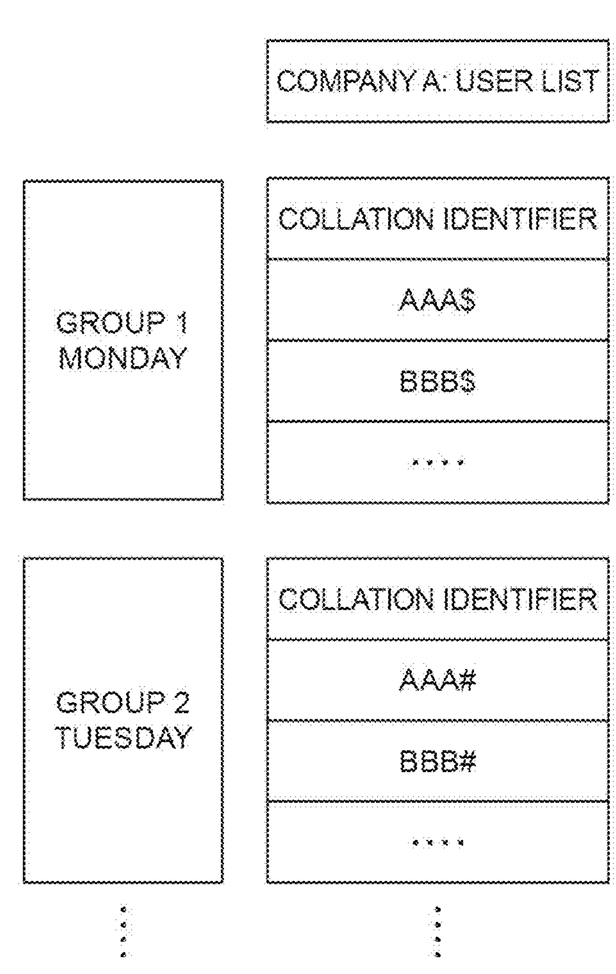
FIG. 5 A diagram illustrating an example of data in which a collation identifier is correlated with the data illustrated in FIG. 4.

FIG. 5 is a diagram illustrating an example of data in which a collation identifier is correlated with the data (user list) illustrated in FIG. 4. As illustrated in FIG. 5, the input unit 11 generates a collation identifier "AAA$" from the user identifier "aaa" and the group identifier "Monday" and correlates the generated collation identifier with the user list. Here, "AAA" in the collation identifier "AAA$" corresponds to (is correlated with) the user identifier "aaa", and "$" corresponds to (is correlated with) the group identifier "Monday." Similarly, the input unit 11 generates a collation identifier "BBB$" from the user identifier "bbb" and the group identifier "Monday," generates a collation identifier "AAA #" from the user identifier "aaa" and the group identifier "Tuesday," generates a collation identifier "BBB #" from the user identifier "bbb" and the group identifier "Tuesday," and correlates the generated collation identifiers with the user list. "BBB" in the collation identifier corresponds to (is correlated with) the user identifier "bbb", and "#" corresponds to (is correlated with) the group identifier "Tuesday." In this embodiment, correspondence between the user identifier "aaa" and the group identifier "Monday" can be easily understood, for example, by setting the collation identifier to "AAAS," but the input unit 11 may generate a collation identifier from which the correspondence is excluded and correlate the generated collation identifier with the user list. For example, the input unit 11 may use data (irreversibly converted data) obtained by multiplying a hash function by data based on a combination of a user identifier and a group identifier as a collation identifier.

As illustrated in FIG. 5, in the user list correlated with the collation identifier, the collation identifier "AAA$" and "BBB$" may be included in group 1 "Monday," and the collation identifiers "AAA #" and "BBB #" may be included in group 2 "Tuesday."

The input unit 11 may output the data correlated with the collation identifiers to the aggregation unit 12 or may store the data in the storage unit 10.

The input unit 11 receives an input of calculation information on a predetermined (arbitrary) calculation (a calculation method). The predetermined calculation may be a calculation which is designated by a user (of the data aggregation device 1) or may be calculation indicated by calculation information stored in advance in the storage unit 10. The predetermined calculation may be, for example, a sum of all the groups (or a week sum), an average, or a difference. The input unit 11 may output the calculation information to the aggregation unit 12 or may store the calculation information in the storage unit 10.

Here, description of the data aggregation device 1 will be stopped and description of the data transmission device 2 will be provided.

Figure 6:
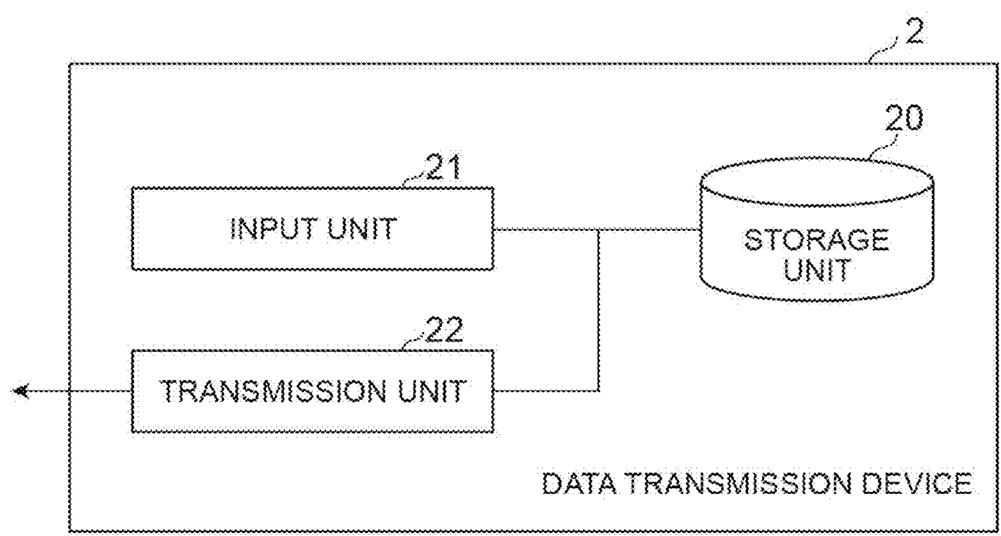
FIG. 6 A diagram illustrating an example of a functional configuration of a data transmission device according to the embodiment.

FIG. 6 is a diagram illustrating an example of the functional configuration of the data transmission device 2 according to the embodiment. As illustrated in FIG. 6, the data transmission device 2 includes a storage unit 20, an input unit 21, and a transmission unit 22.

The functional blocks of the data transmission device 2 are assumed to operate in the data transmission device 2, but are not limited thereto. For example, some of the functional blocks of the data transmission device 2 may be provided in a computer device other than the data transmission device 2 and connected to the data transmission device 2 via a network and serve to appropriately transmit and receive information to and from the data transmission device 2. Some functional blocks of the data transmission device 2 may be omitted, a plurality of functional blocks may be unified into one functional block, and one functional block may be divided into a plurality of functional blocks.

The functions of the data transmission device 2 illustrated in FIG. 6 will be described below. The storage unit 20 and the input unit 21 have the same functions as the storage unit 10 and the input unit 11 of the data aggregation device 1. Description of the same functions will be appropriately omitted.

The storage unit 20 stores arbitrary information used for calculation or the like in the data transmission device 2, calculation results in the data transmission device 2, and the like. For example, the storage unit 20 stores the aforementioned data possessed by company B. Information stored in the storage unit 20 may be appropriately referred to by the functions of the data transmission device 2.

The input unit 21 receives an input of data to be collated. The input data is correlated with individuals and groups. For example, the input unit 21 receives an input of data possessed by company B and stored in the storage unit 20.

FIG. 7 is a diagram illustrating an example of data possessed by company B. The data illustrated in FIG. 7 is user-specific location information which is location information of individuals for each group. As illustrated in FIG. 7, in the user-specific location information, a set of the user identifier "aaa" and location information "area A" (which indicates that an individual identified by the user identifier "aaa" is located in area A) and a set of the user identifier "bbb" and location information "area C" (which indicates that an individual indicated by the user identifier "bbb" is located in area C) are included in group 1 "Monday" in which the group identifier is "Monday," and a set of the user identifier "aaa" and location information "area C" and a set of the user identifier "bbb" and location information "area B" are included in group 2 "Tuesday." That is, the user-specific location information is correlated with individuals and groups. In this embodiment, user-specific location information including location information is employed as an example of the data possessed by company B, but the present disclosure is not limited to the location information, and one or more pieces of arbitrary data may be included. For example, data on one or more attributes (for example, sex and age) of individuals identified by the user identifiers may be included in addition to the user identifiers and the location information.

No user identifiers overlap in the same group. On the other hand, a user identifier may overlap in different groups.

The input unit 21 generates collation identifiers which are identifiers for identifying the individuals and the groups in the input data and correlates the generated collation identifiers with the data.

FIG. 8 is a diagram illustrating an example of data in which a collation identifier is correlated with the data (the user-specific location information) illustrated in FIG. 7. As illustrated in FIG. 8, for example, the input unit 21 generates a collation identifier "AAA$" from the user identifier "aaa" and the group identifier "Monday" and correlates the generated collation identifier with the user-specific location information. Similarly, the input unit 21 generates a collation identifier "BBB$" from the user identifier "bbb" and the group identifier "Monday," generates a collation identifier "AAA #" from the user identifier "aaa" and the group identifier "Tuesday," generates a collation identifier "BBB #" from the user identifier "bbb" and the group identifier "Tuesday," and correlates the generated collation identifiers with the user-specific location information.

As illustrated in FIG. 8, in the user-specific location information correlated with the collation identifiers, a set of the collation identifier "AAA$" and the location information "area A" and a set of the collation identifier "BBB$" and the location information "area C" may be included in group 1 "Monday," and a set of the collation identifier "AAA #" and the location information "area C" and a set of the collation identifier "BBB #" and the location information "area B" may be included in group 2 "Tuesday."

The input unit 21 may output the data correlated with the collation identifiers to the transmission unit 22 or may store the data in the storage unit 20.

The transmission unit 22 transmits the data correlated with the collation identifier which is input from the input unit 21 or the data correlated with the collation identifier which is stored in the storage unit 20 to (the aggregation unit 12 of) the data aggregation device 1 (for the purpose of collation and aggregation).

The data transmission device 2 has been described hitherto. Description of the data aggregation device 1 will be continued.

The aggregation unit 12 collates and aggregates data correlated with collation identifiers for each group on the basis of the collation identifiers. The aggregation unit 12 aggregates data for each group and calculates group-specific aggregation results (aggregation data).

FIG. 9 is a diagram illustrating a situation in which the data illustrated in FIG. 5 and the data illustrated in FIG. 8 are collated and aggregated. Specifically, the aggregation unit 12 collates (counts data with the same collation identifier) or the like and aggregates a collation identifier included in a user list and a collation identifier included in user-specific location information for group 1 "Monday." That is, the aggregation unit 12 aggregates data for day. Both a day (a group) and an individual can be identified using a collation identifier. Since group-specific aggregation results can be identified, a degree of freedom in calculation which will be described later is high.

The aggregation unit 12 may perform the aggregation using a secure computation. The aggregation unit 12 may collate and aggregate data which is de-identified. That is, the input unit 11 and the input unit 21 may receive an input of de-identified data (in advance) (de-identification process is performed thereon before the data is input) or may de-identify the input data. De-identification refers to a process of excluding identifiability between original data and de-identified data. Specifically, when data with an individual table type is assumed, irreversible conversion of information which is key attributes and a process of preventing re-identification from a combination of attribute information associated with the key attributes, a data structure, or the like are assumed, but the present disclosure is not limited thereto.

The aggregation unit 12 may output the calculated group-specific aggregation data to the calculation unit 13 or may store the data in the storage unit 10.

The calculation unit 13 performs a predetermined calculation on the group aggregation results (the group-specific aggregation data) from the aggregation unit 12 (input by the aggregation unit 12). The predetermined calculation may be a calculation indicated by calculation information input from the input unit 11 or may be a calculation indicated by calculation information stored in the storage unit 10. The predetermined calculation may integrate the group aggregation results from the aggregation unit 12. The calculation unit 13 may put the group-specific aggregation data into a pool and perform the predetermined calculation using the whole data.

FIG. 10 is a diagram illustrating an example of group aggregation data. The aggregation data illustrated in FIG. 10 indicates that there are 15 individuals located in area A on Monday, there are 12 individuals located in area B on Monday, there are 38 individuals located in area C on Monday, there are 12 individuals located in area A on Tuesday, there are 21 individuals located in area B on Tuesday, and there are 27 individuals located in area C on Tuesday.

Figure 11:
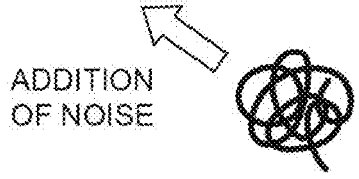
FIG. 11 A diagram illustrating an example of aggregation data into which the aggregation data for each group is integrated.

FIG. 11 is a diagram illustrating an example of aggregation data in which the group aggregation data is integrated (through a predetermined calculation). The aggregation data illustrated in FIG. 11 indicates that there are 105 individuals located in area A, there are 251 individuals located in area B, and there are 316 individuals located in area C in a period of a week (from Monday to Sunday). Noise is added to the aggregation data illustrated in FIG. 11 by the disclosure limitation unit 14 which will be described later.

The calculation unit 13 may output the aggregation data which is a calculation result (an integration result) through the predetermined calculation to the disclosure limitation unit 14 or may store the aggregation data in the storage unit 10.

The disclosure limitation unit 14 performs disclosure limitation by adding noise to the integration result through the predetermined calculation (which is performed by the calculation unit 13). More specifically, the disclosure limitation unit 14 adds noise based on differential privacy (for example, adds a random value) to the aggregation data input from the calculation unit 13 or the aggregation data stored in the storage unit 10 and generates statistical information. For example, the disclosure limitation unit 14 adds noise to a calculation result using day aggregation results. Since noise is added to the calculation result (the integration result) by the disclosure limitation unit 14, it is possible to reduce an influence of noise. The disclosure limitation unit 14 may perform the disclosure limitation using a secure computation.

FIG. 12 is a diagram illustrating an example of statistical information in which noise is added to integrated aggregation data. The statistical information illustrated in FIG. 12 indicates that "−4" is added to the number of individuals located in area A in the aggregation data illustrated in FIG. 11, "19" is added to the number of individuals located in area B, and "−6" is added to the number of individuals located in area C.

The disclosure limitation unit 14 may output the generated statistical information to the output unit 15 or may store the generated statistical information in the storage unit 10.

The output unit 15 outputs the statistical information generated by the disclosure limitation unit 14 or the statistical information stored in the storage unit 10. The output unit 15 may display the statistical information to a user of the data aggregation device 1 via an output device 1006 which will be described later such as a display or may transmit the statistical information to another device via a network. The output unit 15 may output only information subjected to a disclosure limitation process. That is, the output unit 15 may output only information processed by the disclosure limitation unit 14.

Figure 13:
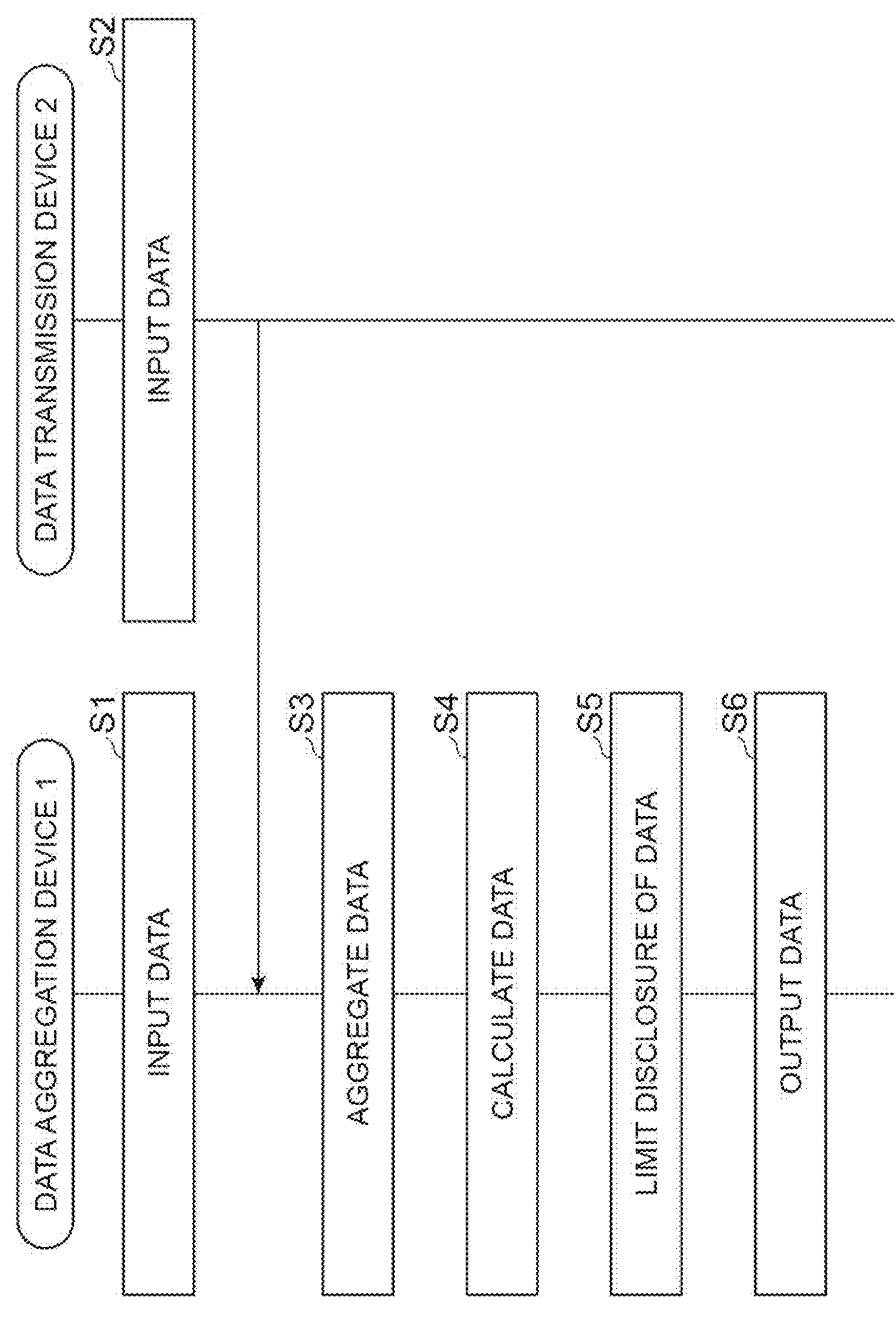
FIG. 13 A sequence diagram illustrating an example of processes that are performed by the data aggregation system.

An example of processes that are performed by the data aggregation system 3 will be described below with reference to FIG. 13. FIG. 13 is a sequence diagram illustrating an example of processes that are performed by the data aggregation system.

First, the input unit 11 of the data aggregation device 1 receives an input of data possessed by company A and correlates the input data with collation identifiers (Step S1). Then, the input unit 21 of the data transmission device 2 receives an input of data possessed by company B, correlates the data with collation identifiers, and the transmission unit 22 transmits the resultant to the data aggregation device 1 (Step S2). The order of S1 and S2 may be reversed. Then, the aggregation unit 12 of the data aggregation device 1 collates and aggregates the data correlated with the collation identifiers in S1 and the data correlated with the collation identifiers in S2 for each group on the basis of the collation identifiers and calculates group-specific aggregation data (Step S3). Then, the calculation unit 13 of the data aggregation device 1 performs a predetermined calculation on the group-specific aggregation data calculated in S3 and calculates aggregation data which is a calculation result (Step S4). Then, the disclosure limitation unit 14 of the data aggregation device 1 performs disclosure limitation by adding noise to the aggregation data calculated in S4 and generates statistical information (Step S5). Then, the output unit 15 of the data aggregation device 1 outputs the statistical information generated in S5 (Step S6).

In this embodiment, the data aggregation device 1 includes the aggregation unit 12, the calculation unit 13, the disclosure limitation unit 14, and the output unit 15, but functional blocks having the same functions may be provided in the data transmission device 2. Similarly, a functional block having the same function as the transmission unit 22 of the data transmission device 2 may be provided in the data aggregation device 1. That is, any of the data aggregation device 1 and the data transmission device 2 may perform processing such as collation and aggregation as a main constituent. Accordingly, both the data aggregation device 1 and the data transmission device 2 can perform interactive processes.

FIG. 14 is a diagram illustrating another example of the processes that are performed by the data aggregation system. In FIG. 14, inputting of data, correlation of the collation identifiers, aggregation, calculation, disclosure limitation, and outputting which have been described above are sequentially illustrated from the top.

Operations and advantages of the data aggregation device 1 according to the embodiment will be described below.

The data aggregation device 1 is a device that collates and aggregates data which is possessed by each of two or more organizations and which is correlated with individuals and groups, the aggregation unit 12 collates and aggregates the data, which is correlated with collation identifiers which are identifiers for identifying the individuals and the groups, for each group on the basis of the collation identifiers. With this configuration, data is collated and aggregated for each group on the basis of the collation identifiers. That is, it is possible to collate data for each group.

The data aggregation device 1 may further include the calculation unit 13 configured to perform a predetermined calculation on an aggregation result for each group from the aggregation unit 12. With this configuration, in order to acquire group-specific aggregation results in the course of processing, various types of aggregation such as a difference and an average of group aggregation results in addition to a sum of all groups can be performed.

The predetermined calculation may be a calculation which is designated in advance by a user. With this configuration, it is possible to perform an arbitrary calculation designated in advance by a user.

The predetermined calculation may integrate the aggregation result for each group from the aggregation unit 12. With this configuration, for example, it is possible to acquire one piece of data as the integration result.

The data aggregation device 1 may further include the disclosure limitation unit 14 configured to perform disclosure limitation by adding noise to an integration result from the predetermined calculation. With this configuration, since noise is added to an integration result (one piece of data), it is possible to prevent a decrease in usefulness due to an influence of noise.

With the data aggregation device 1, the disclosure limitation unit 14 may perform the disclosure limitation using a secure computation. With this configuration, it is possible to perform disclosure limitation in consideration of privacy.

With the data aggregation device 1, the aggregation unit 12 may perform the aggregation using a secure computation. With this configuration, it is possible to perform aggregation in consideration of privacy.

With the data aggregation device 1, the aggregation unit 12 may collate and aggregate the data which is de-identified. With this configuration, it is possible to perform aggregation in consideration of privacy.

The groups may be units of aggregation when the data is collated.

With this configuration, it is possible to more reliably perform aggregation for each unit of aggregation when data is collated.

No individual correlated with the data which is correlated with the same group may overlap. With this configuration, for example, it is possible to more reliably perform secure matching which is a type of secure computation.

The data aggregation device 1 according to the present disclosure employs the following configurations.

[1] A data aggregation device that collates and aggregates data which is possessed by each of two or more organizations and which is correlated with individuals and groups, the data aggregation device including:

an aggregation unit configured to collate and aggregate the data, which is correlated with collation identifiers which are identifiers for identifying the individuals and the groups, for each group on the basis of the collation identifiers.

[2] The data aggregation device according to [1], further including a calculation unit configured to perform a predetermined calculation on an aggregation result for each group from the aggregation unit.

[3] The data aggregation device according to [2], wherein the predetermined calculation is a calculation which is designated in advance by a user.

[4] The data aggregation device according to [2] or [3], wherein the predetermined calculation integrates the aggregation result for each group from the aggregation unit.

[5] The data aggregation device according to [4], further including a disclosure limitation unit configured to perform disclosure limitation by adding noise to an integration result from the predetermined calculation.

[6] The data aggregation device according to [5], wherein the disclosure limitation unit performs the disclosure limitation using a secure computation.

[7] The data aggregation device according to any one of [1] to [6], wherein the aggregation unit performs the aggregation using a secure computation.

[8] The data aggregation device according to any one of [1] to [7], wherein the aggregation unit collates and aggregates the data which is de-identified.

[9] The data aggregation device according to any one of [1] to [8], wherein the groups are units of aggregation when the data is collated.

The data aggregation device according to any one of [1] to [9], wherein no individuals correlated with the data which is correlated with the same group overlap.

With the data aggregation device 1, it is possible to improve usefulness through aggregation using a collation identifier.

As problems, in a system in which data possessed by two (or more) organizations are collated and aggregated without mutual revealing of details of the data and an aggregation result is acquired by adding noise based on differential privacy to the aggregation result, there are problems in that usefulness decreases when there are a plurality of groups of data to be collated and a calculation is performed using an aggregation result for each group.

FIG. 15 is a diagram illustrating an example in which usefulness decreases due to an influence of noise. In FIG. 15, n represents noise. As illustrated in FIG. 15, when a calculation using the aggregation result for each group is performed, an influence of noise is large, and usefulness decreases.

The data aggregation device 1 can perform aggregation for each group and an arbitrary calculation using group-specific aggregation results by generating a collation identifier from a group identifier for identifying a group to be collated and user identifiers. With this data aggregation device 1, it is possible to improve usefulness when a calculation is performed using aggregation results of a plurality of groups.

Problems in the related art will be described below. Three patterns described below can be conceivable as a technique for performing a calculation using aggregation results of a plurality of groups and have problems.

(1) Data of a plurality of groups is merged before inputting the data.

(2) Data is aggregated by groups.

(3) A collation identifier is generated from a group identifier and a user identifier, and data of a plurality of groups is merged.

In the case of (1), since there is a likelihood that the same user identifier will overlap between groups, this technique is not available.

In the case of (2), noise is superimposed, and usefulness decreases. More specifically, since noise is added to the aggregation result for each group through the disclosure limitation process, an influence of noise increases with an increase in the number of groups of both data, and usefulness when calculations (such as summing, averaging, and subtraction) using the aggregation results of a plurality of groups are performed decreases. FIG. 16 is a diagram illustrating a problem when aggregation is performed by groups. As illustrated in FIG. 16, since noise is added to the aggregation result for each group through the disclosure limitation process, the usefulness decreases.

In the case of (3), since groups cannot be identified after the aggregation, only a sum value is calculated, and a degree of freedom in calculation is low. More specifically, since noise is added to the aggregation results of all the groups by generating a collation identifier for identifying a group to be collated in both data and merging and then aggregating all data, an influence of noise can be reduced. However, since no group can be identified after the aggregation, calculations other than summing of all the groups cannot be performed. FIG. 17 is a diagram illustrating a problem when a collation identifier is generated and data of a plurality of groups is merged. As illustrated in FIG. 17, calculations other than summing cannot be performed, and the degree of freedom is low.

With the data aggregation device 1, since noise is curbed to the minimum and usefulness is improved in comparison with (2) and groups can be identified after the aggregation unlike (3), it is possible to perform calculations using group aggregation results (for example, averaging of the group aggregation results).

The block diagrams used to describe the aforementioned embodiments show blocks of the functional units. These functional blocks (constituent units) are realized by an arbitrary combination of at least one of hardware and software. The realization method of the functional blocks is not particularly limited. That is, each functional block may be realized by a single device which is physically or logically coupled, or may be realized by two or more devices which are physically or logically separated and which are directly or indirectly connected (for example, in a wired or wireless manner). Each functional block may be realized by combining software with the single device or the two or more devices.

The functions include determining, deciding, judging, calculating, computing, processing, deriving, investigating, searching, ascertaining, receiving, transmitting, outputting, accessing, resolving, selecting, choosing, establishing, comparing, supposing, expecting, considering, broadcasting, notifying, communicating, forwarding, configuring, reconfiguring, allocating or mapping, and assigning, but are not limited thereto. For example, a functional block (a constituent unit) for transmitting is referred to as a transmitting unit or a transmitter. As described above, the realization method of each function is not particularly limited.

Figure 18:
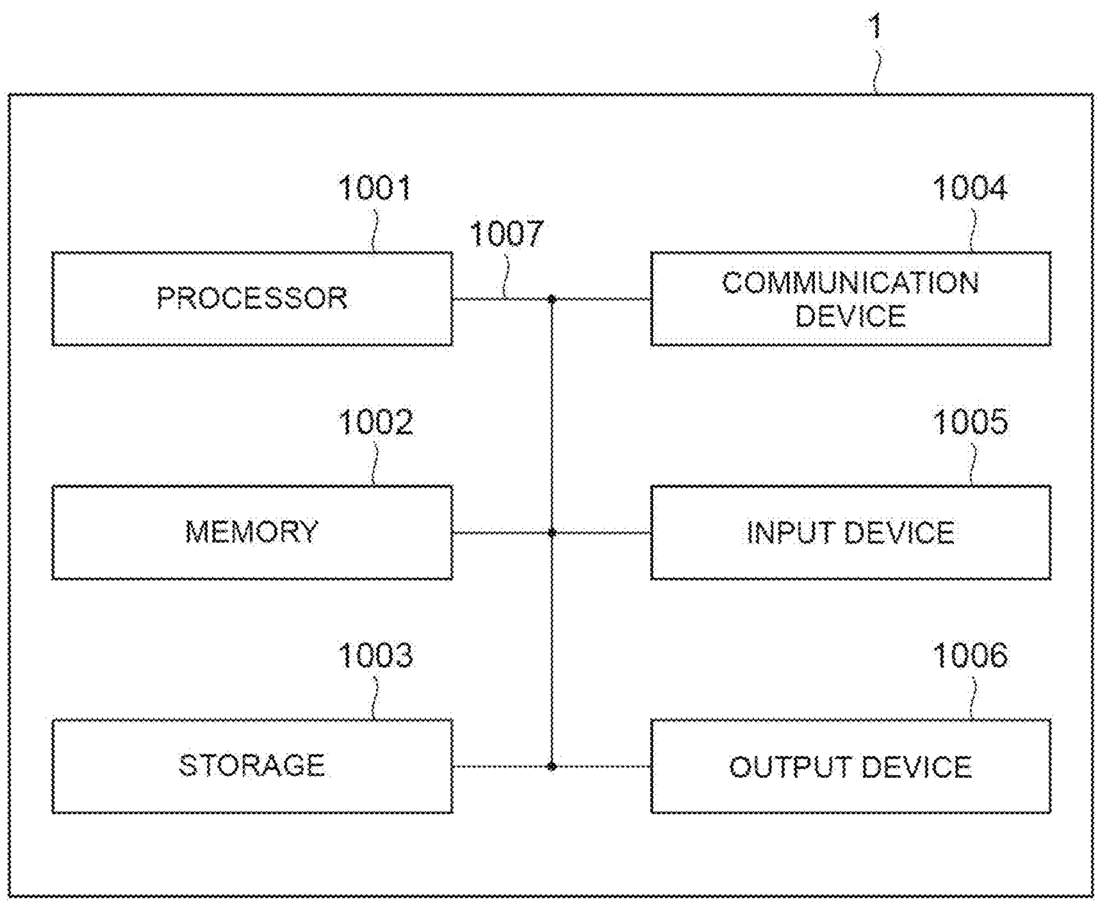
FIG. 18 A diagram illustrating an example of a hardware configuration of a computer that is used as the data aggregation device according to the embodiment.

For example, the data aggregation device 1 or the like according to one embodiment of the present disclosure may serve as a computer that performs the processes of the data aggregation method according to the present disclosure. FIG. 18 is a diagram illustrating an example of a hardware configuration of the data aggregation device 1 according to one embodiment of the present disclosure. The data aggregation device 1 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware configuration of the data aggregation device I may be configured to include one or more devices illustrated in the drawing or may be configured to exclude some devices thereof.

The functions of the data aggregation device 1 can be realized by reading predetermined software (programs) to hardware such as the processor 1001 and the memory 1002 and causing the processor 1001 to execute arithmetic operations and to control communication using the communication device 1004 or to control at least one of reading and writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the input unit 11, the aggregation unit 12, the calculation unit 13, the disclosure limitation unit 14, and the output unit 15 may be realized by the processor 1001.

The processor 1001 reads a program (program codes), a software module, data, or the like from at least one of the storage 1003 and the communication device 1004 to the memory 1002 and performs various processes in accordance therewith. As the program, a program that causes a computer to perform at least some of the operations described in the above-mentioned embodiment is used. For example, the input unit 11, the aggregation unit 12, the calculation unit 13, the disclosure limitation unit 14, and the output unit 15 may be realized by a control program which is stored in the memory 1002 and which operates in the processor 1001, and other functional blocks may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (program codes), a software module, and the like that can be executed to perform a wireless communication method according to one embodiment of the present disclosure.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage media may be, for example, a database, a server, or other appropriate media including at least one of the memory 1002 and the storage 1003.

The communication device 1004 is hardware (a transmitting and receiving device) that performs communication between computers via at least one of a wired network and a wireless network and is also referred to as, for example, a network device, a network controller, a network card, or a communication module. The communication device 1004 may include, for example, a high-frequency switch, a duplexer, a filter, and a frequency synthesizer in order to realize at least one of frequency division duplex (FDD) and time division duplex (TDD). For example, the input unit 11, the aggregation unit 12, the calculation unit 13, the disclosure limitation unit 14, and the output unit 15 may be realized by the communication device 1004.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The data aggregation device 1 may be configured to include hardware such as a microprocessor, a digital signal processor (DSP), an application-specific integrated circuit (ASIC), a programmable logic device (PLD), or a field-programmable gate array (FPGA), and some or all of the functional blocks may be realized by the hardware. For example, the processor 1001 may be mounted using at least one piece of the hardware.

Notifying of information is not limited to the aspects/embodiments described in the present disclosure and may be performed using another method.

The aspects/embodiments described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), or another appropriate system and a next-generation system which is extended based thereon. A plurality of systems may be combined (for example, a combination of at least one of LTE and LTE-A and 5G) and applied.

The order of processing steps, the sequences, the flowcharts, and the like of the aspects/embodiments described above in the present disclosure may be changed unless conflictions arise. For example, in the methods described in the present disclosure, various steps are described as elements in the exemplary order, and the methods are not limited to the described specific order.

Information or the like which is input or output may be stored in a specific place (for example, a memory) or may be managed using a management table. Information or the like which is input or output may be overwritten, updated, or added. Information or the like which is output may be deleted. Information or the like which is input may be transmitted to another device.

Determination may be performed using a value (0 or 1) which is expressed by one bit, may be performed using a Boolean value (true or false), or may be performed by comparison between numerical values (for example, comparison with a predetermined value).

The aspects/embodiments described in the present disclosure may be used alone, may be used in combination, or may be switched during implementation thereof. Notifying of predetermined information (for example, notifying that "it is X") is not limited to explicit notification, and may be performed by implicit notification (for example, notifying of the predetermined information is not performed).

While the present disclosure has been described above in detail, it will be apparent that the present disclosure is not limited to the embodiments described in the present disclosure. The present disclosure can be altered or modified in various forms without departing from the gist and scope of the present disclosure defined by description in the appended claims. Accordingly, the description in the present disclosure is for exemplary explanation and does not have any restrictive meaning for the present disclosure.

Regardless of whether it is called software, firmware, middleware, microcode, hardware description language, or another name, software can be widely construed to refer to a command, a command set, a code, a code segment, a program code, a program, a sub program, a software module, an application, a software application, a software package, a routine, a sub routine, an object, an executable file, an execution thread, a sequence, a function, or the like.

Software, commands, information, and the like may be transmitted and received via a transmission medium. For example, when software is transmitted from a website, a server, or another remote source using at least one of wired technology (such as a coaxial cable, an optical fiber cable, a twisted-pair wire, or a digital subscriber line (DSL)) and wireless technology (such as infrared rays or microwaves), the at least one of wired technology and wireless technology is included in definition of the transmission medium.

Information, signals, and the like described in the present disclosure may be expressed using one of various different techniques. For example, data, instructions, commands, information, signals, bits, symbols, and chips which can be mentioned in the overall description may be expressed by a voltage, a current, electromagnetic waves, a magnetic field or magnetic particles, a photo field or photons, or an arbitrary combination thereof.

Terms described in the present disclosure and terms required for understanding the present disclosure may be substituted with terms having the same or similar meanings.

Terms "system" and "network" used in the present disclosure are compatibly used.

Information, parameters, and the like described above in the present disclosure may be expressed using absolute values, may be expressed using values relative to predetermined values, or may be expressed using other corresponding information.

Names used for the aforementioned parameters are not restrictive names in any respect. Numerical expressions or the like using these parameters may be different from those explicitly described in the present disclosure.

The term "determining" or "determination" used in the present disclosure may include various types of operations. The term "determining" or "determination" may include cases in which judging, calculating, computing, processing, deriving, investigating, looking up, search, or inquiry (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined." "Determining" may be replaced with "assuming," "expecting," "considering," or the like.

The terms "connected" and "coupled" or all modifications thereof refer to all direct or indirect connecting or coupling between two or more elements, and can include a case in which one or more intermediate elements are present between the two elements "connected" or "coupled" to each other. Coupling or connecting between elements may be physical, logical, or a combination thereof. For example, "connecting" may be replaced with "accessing." In the present disclosure, two elements can be considered to be "connected" or "coupled" to each other using at least one of one or more electrical wires, cables, and printed circuits and using electromagnetic energy or the like having wavelengths of a radio frequency area, a microwave area, and a light (both visible and invisible light) area in some non-limiting and non-inclusive examples.

The expression "based on~" used in the present disclosure does not mean "based on only~" unless otherwise described. In other words, the expression "based on~" means both "based on only~" and "based on at least ~."

No reference to elements named with "first," "second," or the like used in the present disclosure generally limit amounts or order of the elements. These naming can be used in the present disclosure as a convenient method for distinguishing two or more elements. Accordingly, reference to first and second elements does not mean that only two elements are employed or that a first element precedes a second element in any form.

"Means" in the configurations of the devices may be replaced with "unit," "circuit," "device," or the like.

When the terms "include" and "including" and modifications thereof are used in the present disclosure, the terms are intended to have a comprehensive meaning similarly to the term "comprising." The term "or" used in the present disclosure is not intended to mean an exclusive logical sum.

In the present disclosure, for example, when an article such as "a," "an," or "the" in English is added in translation, the present disclosure may include a case in which a noun subsequent to the article is of a plural type.

In the present disclosure, the expression "A and B are different" may mean that "A and B are different from each other." The expression may mean that "A and B are different from C." Expressions such as "separated" and "coupled" may be construed in the same way as "different."

REFERENCE SIGNS LIST

1 . . . Data aggregation device, 2 . . . Data transmission device, 3 . . . Data aggregation system, 10 . . . Storage unit, 11 . . . Input unit, 12 . . . Aggregation unit, 13 . . . Calculation unit, 14 . . . Disclosure limitation unit, 15 . . . Output unit, 20 . . . Storage unit, 21 . . . Input unit, 22 . . . Transmission unit, 1001 . . . Processor, 1002 . . . Memory, 1003 . . . Storage, 1004 . . . Communication device, 1005 . . . Input device, 1006 . . . Output device, 1007 . . . Bus.

The invention claimed is:

1. A data aggregation device that collates and aggregates data which is possessed by each of two or more organizations and which is correlated with individuals and groups, the data aggregation device comprising:

processing circuitry configured to:

acquire the data, wherein at least a part of the data is acquired via a network from a device managed by one of the two or more organizations communicatively connected via the network; and collate and aggregate the acquired data, which is correlated with collation identifiers which are identifiers for identifying the individuals and the groups, for each group on a basis of the collation identifiers, wherein the processing circuitry is further configured to perform a predetermined calculation on an aggregation result for each group, and wherein the predetermined calculation integrates the aggregation result for each group.

2. The data aggregation device according to claim 1, wherein the predetermined calculation is a calculation which is designated in advance by a user.

3. The data aggregation device according to claim 1, wherein the processing circuitry is further configured to perform disclosure limitation by adding noise to an integration result from the predetermined calculation.

4. The data aggregation device according to claim 3, wherein the processing circuitry is configured to perform the disclosure limitation using a secure computation.

5. The data aggregation device according to claim 4, wherein the processing circuitry is configured to perform the aggregation using a secure computation.

6. The data aggregation device according to claim 1, wherein the groups are units of aggregation when the data is collated.

7. The data aggregation device according to claim 1, wherein no individuals correlated with the data which is correlated with the same group overlap.

8. A data aggregation device that collates and aggregates data which is possessed by each of two or more organizations and which is correlated with individuals and groups, the data aggregation device comprising:

processing circuitry configured to:

acquire the data, wherein at least a part of the data is acquired via a network from a device managed by one of the two or more organizations communicatively connected via the network; and collate and aggregate the acquired data, which is correlated with collation identifiers which are identifiers for identifying the individuals and the groups, for each group on a basis of the collation identifiers, wherein the processing circuitry is configured to perform the aggregation using a secure computation.

9. A data aggregation device that collates and aggregates data which is possessed by each of two or more organizations and which is correlated with individuals and groups, the data aggregation device comprising:

processing circuitry configured to:

acquire the data, wherein at least a part of the data is acquired via a network from a device managed by one of the two or more organizations communicatively connected via the network; and collate and aggregate the acquired data, which is correlated with collation identifiers which are identifiers for identifying the individuals and the groups, for each group on a basis of the collation identifiers, wherein the processing circuitry is configured to collate and aggregate the data which is de-identified.

* * * * *